United States Patent
Kaspersky et al.

(10) Patent No.: US 10,238,972 B2
(45) Date of Patent: Mar. 26, 2019

(54) SYSTEM AND METHOD OF MODELING THE BEHAVIOR OF GAME ELEMENTS DURING A REMOTE GAME

(71) Applicant: AO Kaspersky Lab, Moscow (RU)

(72) Inventors: Eugene V. Kaspersky, Moscow (RU); Alexey M. Chikov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 15/669,259

(22) Filed: Aug. 4, 2017

(65) Prior Publication Data

US 2018/0272234 A1   Sep. 27, 2018

(30) Foreign Application Priority Data

Mar. 24, 2017   (RU) ................. 2017109813

(51) Int. Cl.
| | |
|---|---|
| *A63F 13/57* | (2014.01) |
| *A63F 13/52* | (2014.01) |
| *A63F 13/53* | (2014.01) |
| *A63F 13/213* | (2014.01) |
| *A63F 13/211* | (2014.01) |
| *A63F 13/812* | (2014.01) |
| *A63F 13/245* | (2014.01) |
| *A63F 13/56* | (2014.01) |

(52) U.S. Cl.
CPC ............ *A63F 13/57* (2014.09); *A63F 13/211* (2014.09); *A63F 13/213* (2014.09); *A63F 13/245* (2014.09); *A63F 13/52* (2014.09); *A63F 13/53* (2014.09); *A63F 13/56* (2014.09); *A63F 13/812* (2014.09)

(58) Field of Classification Search
USPC ........................................... 463/2
See application file for complete search history.

(56) References Cited

U.S. PATENT DOCUMENTS

| | | |
|---|---|---|
| 2011/0021256 A1 | 1/2011 | Lundback et al. |
| 2011/0053688 A1 | 3/2011 | Crawford et al. |
| 2015/0157944 A1 | 6/2015 | Gottlieb |
| 2016/0144268 A1 | 5/2016 | Stimac |

FOREIGN PATENT DOCUMENTS

| | | |
|---|---|---|
| WO | 2009/126982 A2 | 10/2009 |
| WO | 2010/000068 A1 | 1/2010 |

*Primary Examiner* — Pierre E Elisca
(74) *Attorney, Agent, or Firm* — Michael Fainberg; Arent Fox LLP

(57) ABSTRACT

Disclosed are systems and methods for modeling behavior of game elements during a remote game between at least two users. The system includes a positioning module configured to determine parameters for at least two game elements representing physical objects, and game manipulators that detect a physical action performed by a user in order to exert a force action on at least one game element and calculate one or more physical parameters characterizing the physical action. The system further includes a module for performing force actions that determines the game element to be subject to the detected physical action and perform a force action on the determined game element. The system further includes a control module that determines behavior parameters for the game elements characterizing a change in state of the game elements, and a visualization module that generates a behavior model of the game elements.

20 Claims, 3 Drawing Sheets

SYSTEM AND METHOD OF MODELING THE BEHAVIOR OF GAME ELEMENTS DURING A REMOTE GAME

CROSS-REFERENCE TO RELATED APPLICATIONS

This application claims benefit of priority under 35 U.S.C. 119(a)-(d) to a Russian Application No. 2017109813 filed on Mar. 24, 2017, which is incorporated by reference herein.

FIELD OF TECHNOLOGY

The present disclosure relates to the field of modeling physical processes, more specifically, systems and methods of modeling the behavior of game elements during a remote game.

BACKGROUND

Due to the increasing computing power of modern computers, it has become possible to implement a virtual reality, within which diverse physical processes are modeled. This has found an application in the entertainment industry—a large number of computer game simulators have appeared, in which the user can control simulated objects as if it were occurring in real life (with a given level of precision, of course). The use of virtual reality has made it possible for users in different locations to play together, interacting with the very same objects.

The main problem with computer models of physical processes (such as the modeling of the problems of interaction of several material bodies, where the problems may involve certain computer games such as billiards, table soccer, and so forth) is the great complexity of the computations of the interaction of physical objects with each other (ball, players, elements of the game table, and so on). The complexity of the calculations performed leads to low accuracy or speed of such calculations, which negatively affects the level of comfort and the feeling of reality of the game, or results in great expense for the organization of the computer system which is able to perform the necessary calculations with the necessary accuracy.

At present, there are many physics engines (computer programs which perform a computer modeling and simulation of the physical laws of the real world in a virtual world), both commercial (such as Havok™) and free of charge (such as PhysX™), which provide their own API (Application Programming Interface) for modeling diverse physical processes and physical systems. The main drawback of the existing physics engines is the low precision of the calculations and the limited number of interacting objects or types of interacting objects (for example, it is very hard to realize a modeling of the interaction of rubber objects).

Besides the modeling of physical processes, a proper visualization of the processes being modeled is also necessary for a comfortable experience of the virtual reality by the user. Many different techniques are used for this, employing a large array of computing devices (such as video cards). One method of visualizing a particular physical model is the method of ray tracing, in which the behavior of the rays of light passing through the model of the physical processes is simulated. Even so, this method of visualization is exceedingly resource-hungry and cannot be incorporated in real time on existing computing devices (even supercomputers). In order to find a compromise between the usable computing resources and the accuracy of the visualization, simplifications are made, such as a backward ray tracing, which work noticeably faster, but produce less accurate results.

Therefore, in order to solve the above-described problems, various methods of realization of physical processes are employed, during which the users can remotely perform various actions and observe the result of the performance of those actions. For example, during the execution of a remote game between users (say, billiards) the users can control the cue sticks remotely, striking the billiard balls which are also remotely present on the billiard table and observing the results of their game on monitors.

Although the above-described methods work well with problems of simulating simple physical processes, as well as the visualization of the processes being simulated, they cannot handle the modeling and visualization of complex processes (identical to physical ones) or work with a large number of simulated processes. As such, there is a need to improve the simulation of the interaction of physical objects.

SUMMARY

Exemplary aspects of the present disclosure are designed to visualize the modeling of physical processes. The technical result of the present disclosure is to increase the accuracy of the modeling of the behavior of game elements. Yet another technical result of the present disclosure is to improve the accuracy of the visualization by the user of the behavior of the game elements. Yet another technical result of the present disclosure is to increase the accuracy of the feedback of the game manipulator simulating the force action on the game elements by the forming of a physical playing field and game elements, applying force actions to the created game elements, and changing the state of the game manipulator on the basis of the behavior parameters of the game elements subjected to the force action. Yet another technical result is to increase the accuracy of the transmitted position of the game elements at the moment of transmission of a move during a remote game between at least two players, which is accomplished by simulating the behavior of the game elements.

These results are achieved by the use of methods for modeling the behavior of game elements during a remote game between at least two users, containing steps which are realized with the aid of a module from the system of modeling the behavior of the game elements, and in which: with the aid of positioning module, the parameters are determined for at least two game elements representing material objects whose mutual disposition and physical properties are determined by the parameters of the game elements and which characterize the states of the aforementioned game elements; with the aid of the game manipulator, a physical action is tracked which is performed by a user in order to exert a force action on at least one game element, and upon detection of the physical action the physical parameters characterizing that physical action are calculated; with the aid of a module for performing force actions, on the basis of the determined parameters of at least one game element and the calculated physical parameters, the game element is determined which needs to be subjected to the force action, and the parameters of that force action on the determined game element are calculated; with the aid of the module for performing force actions, a force action is performed on the determined game element in accordance with the calculated parameters of the force action; with the aid of a control module, the behavior of the game elements is tracked and the parameters of that behavior are determined, wherein the parameters of the behavior characterize the change in state of the game elements; with the aid of visualization module, a model of the behavior of the game elements is formed on the basis of the determined parameters of the game elements and the determined behavior parameters of the game elements.

In another exemplary aspect, each user employs his own game manipulator in order to perform the force action on at least one game element.

In yet another exemplary aspect, the game element is a material object, whose spatial coordinates and physical properties are determined by the physical parameters of the game element.

In another exemplary aspect, the game element may be a playing field—a physical object on which other game elements are situated.

In yet another exemplary aspect, the playing field is a billiard table.

In another exemplary aspect, the game element is a billiard ball.

In yet another exemplary aspect, the game elements are remote from the user so that the user in performing the physical action is not able to directly apply a force action to the game elements.

In another exemplary aspect, the physical parameters of the physical action are at least: the vector and magnitude of the velocity of application of the physical action; the vector and magnitude of the momentum of application of the physical action; the vector and magnitude of the angular momentum of application of the physical action; the energy transmitted as a result of the application of the physical action.

In yet another exemplary aspect, the force action on the game element is applied by at least one of the following methods: mechanically, by striking the game element with the module of applying the force actions; by transfer of an electromagnetic pulse to the game element from the module for applying the force actions.

In another exemplary aspect, the parameters of the force action include: the time of the force action; the position of the force action on the game element; the force exerted on the game element in the determined position and at the determined time.

In yet another exemplary aspect, the force exerted on the game element is characterized by at least: the physical force acting on the game element; the momentum transmitted to the game element; the energy transmitted to the game element.

In another exemplary aspect, the model of the behavior of the game elements is at least: a set of virtual 3D models of the game elements, where each said 3D model is coordinated with a time during which said 3D model was the current one; a video stream recorded from the playing field created.

In yet another exemplary aspect, the control module includes at least video cameras, motion sensors, range finders and thermal imagers therein for tracking the behavior of the game elements, as well as software for determining the parameters of the mentioned behavior.

In another exemplary aspect, the behavior parameters of the game elements characterize the change in state of the game manipulator.

In yet another exemplary aspect, the control module implements a feedback from the game manipulator, consisting in a change in state of the game manipulator on the basis of the behavior parameters of the game elements to which the force action has been applied;

In another exemplary aspect, the visualization module after creating the behavior model of the game elements performs a visualization of the game elements.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
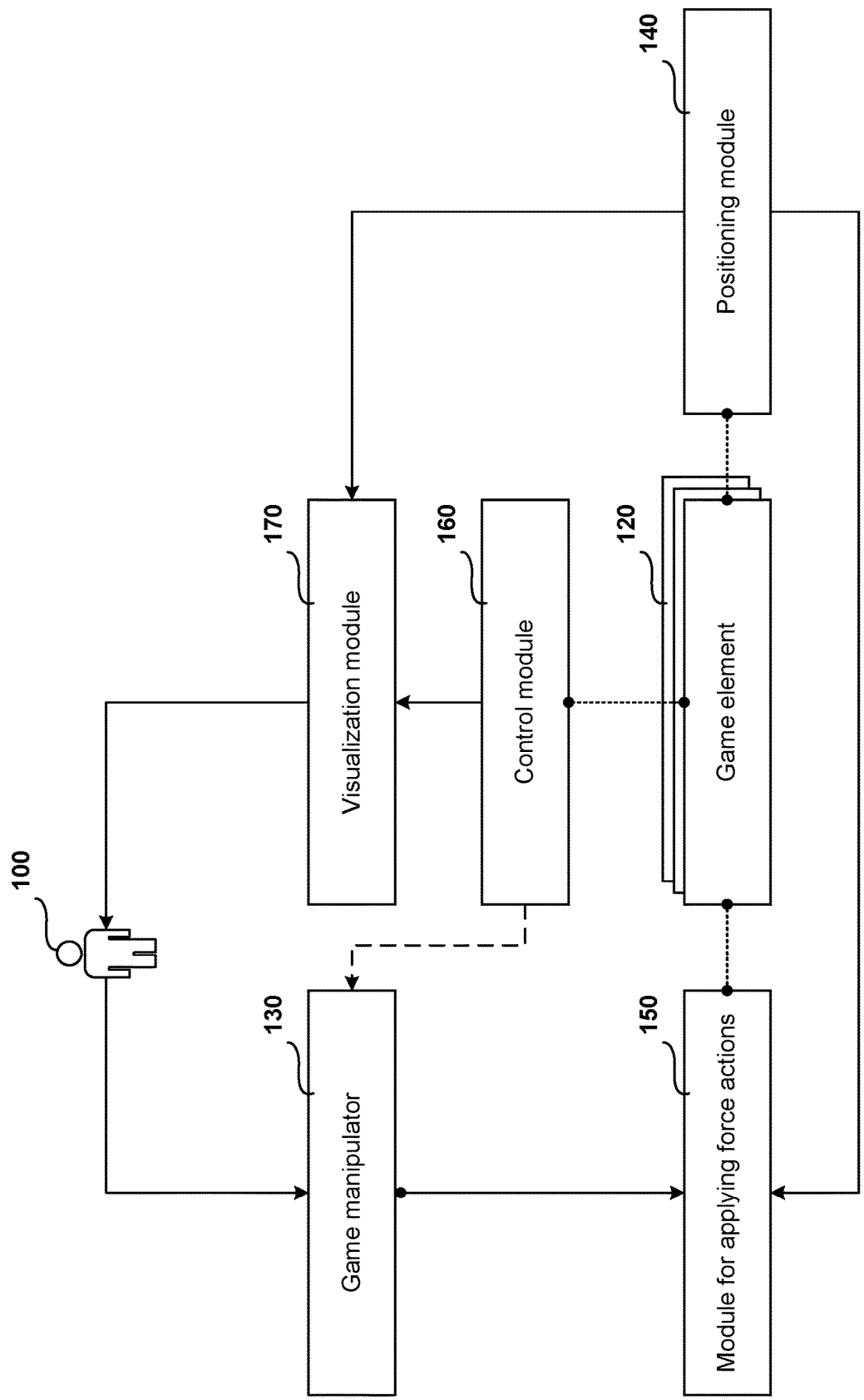
FIG. 1 illustrates a block diagram of a system for modeling the behavior of game elements during a remote game according to an exemplary aspect.

FIG. 1 illustrates a block diagram of a system for modeling the behavior of game elements during a remote game according to an exemplary aspect. A remote game between players is a game during which game elements and players are located at distance from each other, preventing a direct interaction of the players with the game elements (for example, the players are not able to directly apply force actions to the game elements). The system for modeling the behavior of game elements during a remote game between two or more users 100 includes game elements 120, a game manipulator 130, a positioning module 140, a module for applying force actions 150, a control module 160 and a visualization module 170.

For simplicity, the users 100.1 and 100.2 are represented as a single user 100, and the playing field 120.1 and the game elements 120.2 are represented solely as game elements 120.

Figure 3:
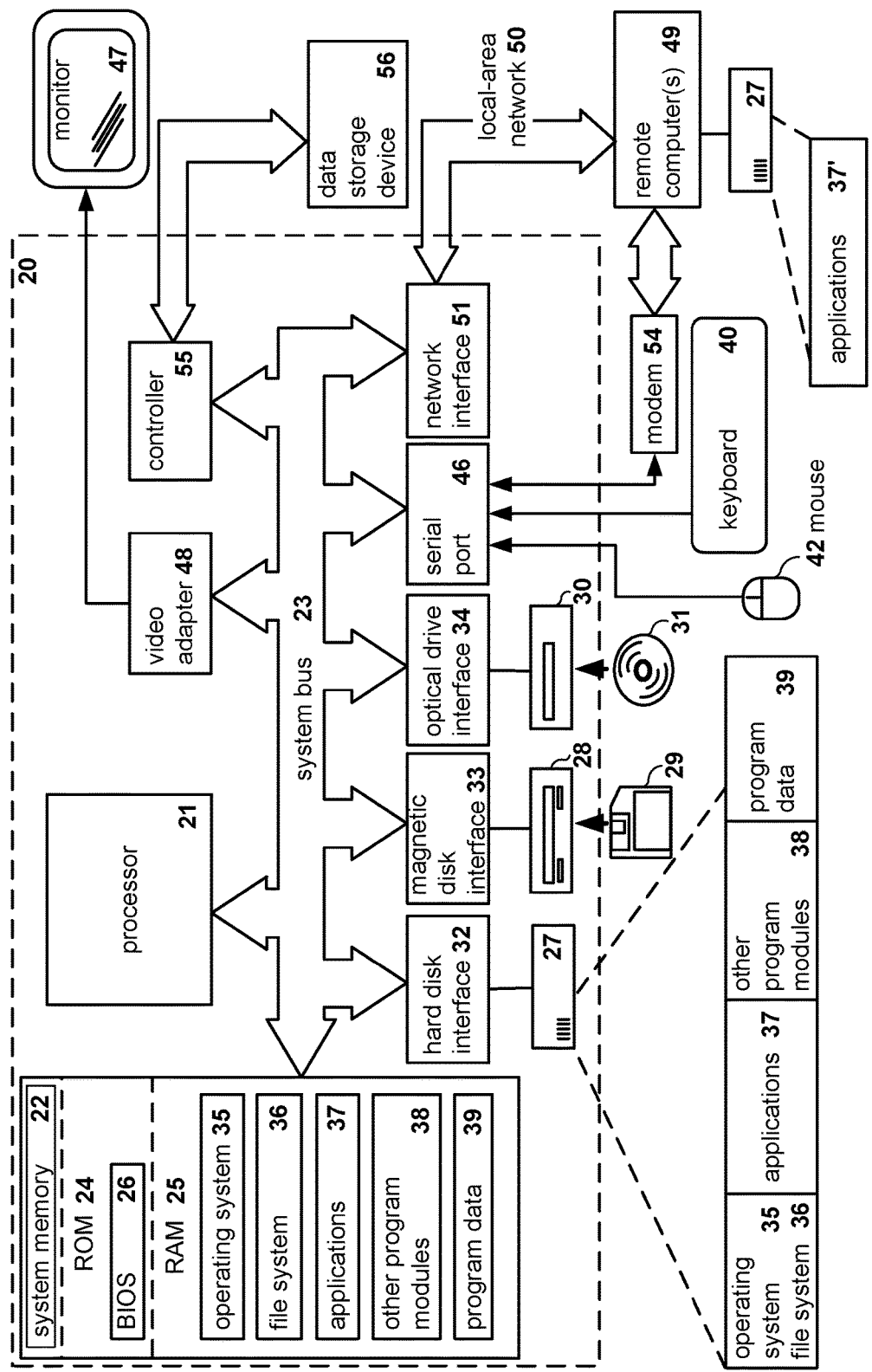
FIG. 3 illustrates a block diagram of a general-purpose computer system on which the disclosed system and method can be implemented according to an exemplary aspect.

In one exemplary aspect, the game manipulator 130, the positioning module 140, the module for applying force actions 150 and the visualization module 170 can be computer peripheral devices, while the control module 160 can be a component of a general-purpose computer system, a personal computer, or a server, as described in FIG. 3.

In some exemplary aspects, one of the game elements 120 may be a playing field, or material object on which the other game elements 120 are arranged. In some exemplary aspects, the playing field is a billiard table, and the game element arranged on the playing field is a billiard ball. For example, the set of all game elements 120 present in the system for modeling the behavior of game elements during a remote game is a billiard table for playing snooker, 1 white, 6 colored, and 15 red balls of sizes, weight, material and shape corresponding to the rules of playing snooker.

In one exemplary aspect, the game elements 120 are removed from the user 100 such that the user 100 in performing the physical action is not able to directly apply a force action to the game elements. For example, the user #1 100.1 may be in one city, user #2 100.2 in another, and the billiard table with billiard balls in a third.

In one exemplary aspect, a game element 120 may be a material object whose spatial coordinates and physical properties are determined by the physical parameters of the game element 120. In one exemplary aspect, the physical properties of each game element 120 may include:
the physical dimensions,
the speed of movement as a vector quantity (including the direction of movement and the scalar value of the speed of movement),
the coefficient of friction of the surface.

For example, in the case when the game elements 120 are a billiard table and billiard balls, the physical properties for the game elements 120 may include the radii of the balls, their spatial coordinates, the initial speeds, the coefficients of friction of the cloth of the playing field and the surface of the billiard balls.

The game manipulator 130 is configured to detect a physical action performed by the user 100 in order to apply a force action to at least one game element 120. The game manipulator 130 may be further configured to calculate the physical parameters characterizing the detected physical action, and change its state on the basis of data obtained from the control module 160. The state of the game manipulator 130 may include at least the vector speed of movement of the game manipulator 130 (such as a decelerating motion), the amplitude and frequency characteristics of vibration of the game manipulator 130, and the temperature characteristics of the game manipulator 130. The game manipulator 130 may be further configured to then transmit the calculated parameters to the module for applying force actions 150.

The state of the game manipulator 130 characterizes at least its
behavior (such as the force of vibration),
physical characteristics (such as geometric dimensions);

In one exemplary aspect, each user 100 employs their own respective instance of a game manipulator 130 in order to apply the force action to at least one game element 120.

In one exemplary aspect, the game manipulator 130, in order to detect a physical action performed by the user 100, may capture the motion in a contact manner or a noncontact manner. To capture the motion in a contact manner, the game manipulator 130 can use sensors attached to the user 100 or built into the game manipulator 130 to obtain sensor data indicative of the motion. To capture motion in a noncontact manner, the game manipulator 130 can use video cameras, motion sensors, and so forth to obtain other data indicative of the motion.

In the exemplary aspect in which the game elements 120 are a billiard table and billiard balls (i.e., for a remote billiards game), the contact-type game manipulator 130 can be a sensor-type game controller, designed in the shape of a cue stick, having a corresponding weight and balance and containing sensors designed to determine the physical actions being performed by the user 100 and calculate the physical parameters characterizing the determined physical actions.

In one exemplary aspect, the non-contact game manipulator 130 can be a motion sensing input device, such as the Kinect™ system made available by Microsoft. The user 100 can perform movements of aiming and striking a ball with a cue stick (there need not be any cue stick at all in the hands of the user 100 for this, nor any billiard table on which the game is being played), the motion sensing input device performs a video recording of the actions of the user 100 (thus digitizing their actions), identifies the movements being performed, and calculates values of the physical parameters of the movements being performed by the user 100, such as the speed of impact, the acceleration of impact, the vector of motion, the torsion, and so on. In the case of using a contact-type sensor game manipulator 130, the above indicated physical parameters are obtained by the game manipulator 130 from sensors installed in the game controller or they are calculated on the basis of data obtained from other sensors of the game manipulator 130.

In one exemplary aspect, the game manipulator 130 may calculate the physical parameters of the physical action being performed include at least:
the vector and magnitude of the speed of performance of the physical action;
the vector and magnitude of the momentum of performance of the physical action;
the vector and magnitude of the angular momentum of performance of the physical action; and
the energy transmitted as a result of performance of the physical action.

In one exemplary aspect, the game manipulator 130 changes its state on the basis of the behavior parameters of the game manipulator 130 (i.e., the behavior parameters of the game elements characterize the change in state of the game manipulator), such as the vector speed of movement of the game manipulator 130, the amplitude and frequency characteristics of the vibration of the game manipulator 130, and the temperature characteristics of the game manipulator 130, which are obtained from the control module 160. For example, the game manipulate 130 changes its state based on a speed vector indicating a decelerating motion, thereby creating a feeling in the user of a force action of the game manipulator 130 on the physical object, even though no such force action is performed. In another example, in the case of using a contact-type game manipulator 130 in the form of a cue stick, the mentioned manipulator when striking the ball can simulate the vibrations occurring during impact, the resistance to impact, and so forth. The behavior parameters of the game elements 120 characterize the change in state of the game manipulator 130.

In one exemplary aspect, the positioning module 140 is configured to determine the parameters of at least two game elements 120. The parameters of the game elements may determine the mutual arrangement and physical properties of the game elements 120 and characterize the states of the mentioned game elements. The positioning module 140 may be further configured to change the state of at least one game element 120 (such as the position of the game element 120) on the basis of the data obtained from the control module 160, and transmit the parameters of the game elements previously determined by the positioning means 140 to the module for applying force actions 150 and to the visualization module 170.

In one exemplary aspect, the physical properties of the game elements 120 may include:
the physical dimensions;
the weight;
the shape;

the vector velocity;
the vector acceleration;
the moment of inertia;
the angular momentum;
the kinetic and potential energy possessed by the game element.

Moreover, the positioning module 140 enables a modification of the playing field 120 on the basis of previously specified data (such as the type of game) or data received from the control module 160. In one exemplary aspect, modification of the playing field 120 may include changing the geometry of the playing field 120, such as changing the physical dimensions of the playing field, changing the number and disposition of game elements 120 on the playing field, and so forth. In other exemplary aspects, modification of the playing field 120 may also include changing the characteristics of the surface of the playing field 120, for example, changing the force of friction of the surface of the playing field, changing the hardness of the surface of the playing field.

For example, for different types of billiards (e.g., Russian billiards, pool, snooker, carom billiards, and so forth), billiard tables of different shape are used, with different dimensions and arrangements of pockets. The playing field 120 can be arranged so that it can dynamically alter its physical dimensions (due to movable tiles forming the surface of the billiard table) depending on the chosen type of billiard game. Similarly, the billiard pockets can change their dimensions (due to being designed in the form of diaphragms) and position (by moving the physical design of the pocket in the necessary position at the edge of the billiard table). Depending on which type of billiard game is chosen, billiard balls of corresponding size, weight, and other physical properties are also chosen.

The module for applying force actions 150 may be configured to determine the game element 120 which needs to be subjected to the force action on the basis of the parameters of the game elements as determined by positioning module 140 and the physical parameters of the detected physical action as calculated by the game manipulator 130. The module for applying force actions 150 may be also configured to calculate the parameters of the force action on the determined game element 120 and apply the force action to the determined game element 120 in accordance with the calculated parameters of the force action.

In one exemplary aspect, the force action is applied to a game element mechanically, by striking the game element 120 with the module for applying force actions 150. In some exemplary aspects, the force action may be applied to a game element by transfer of an electromagnetic pulse to the game element 120 from the module for applying force actions 150.

For example, for a billiard table 120.1 and billiard balls 120.2, the system of applying mechanical force actions 150 to the billiard ball 120.2 can be realized as follows: a system travels on guideways above the billiard table, including a striking rod and an electromagnetic coil, controlling the movement of the rod. This system is able to be positioned in all three planes and can be arranged in front of a billiard ball 120.2 such that the next strike by the striking rod will occur at the spot where the user 100 is aiming, and with such parameters of the force action (transfer of energy, momentum, etc.) as correspond to the physical action of the user 100.

On the other hand, for the billiard table 120.1 and billiard balls 120.2 the system of applying force actions 150 to a billiard ball 120.2 with the aid of an electromagnetic pulse can be realized as follows: a system of electromagnets is located beneath the billiard table 120.1, which upon receiving a command forms an electromagnetic pulse of the necessary structure (with structure of the electromagnetic pulse meaning the duration, the amplitude and frequency characteristics of the electromagnetic pulse, and so on) so as to impart to the billiard ball 120.2 (inside which is material possessing ferromagnetic properties) the necessary energy, momentum, vector of motion (including torsion), and so forth. The electromagnetic pulse can be prolonged, imitating a cue strike with backspin.

In one exemplary aspect, the module for applying force actions 150 may calculate the parameters of the force action including one or more temporal characteristics of the force action (such as the timestamp for the start of application of the force action and the time interval during which the force action is applied). In some exemplary aspects, the module for applying force actions 150 may calculate a position of the force action on the game element 120, meaning by position of the force action the spot in the game element 120 (particularly on the surface of the game element 120) where the force action is applied. In other exemplary aspects, the module for applying force actions 150 may calculate a force applied to the game element 120 at the determined position and at the determined time.

In one exemplary aspect, the force applied to the game element 120 may be characterized by at least the physical force acting on the game element 120; the momentum transferred to the game element 120; and the energy transferred to the game element.

The control module 160 may be configured to track the behavior of the game elements 120 during the exerting of the force action by the module for applying force actions 150. The behavior of a game element 120 may be the change in the characteristics of the game element 120 over time (such as the vector velocity, the spatial coordinates of the game element 120 and so forth). The control module 160 is further configured to determine the parameters of that behavior, the parameters of the behavior characterizing the change in state of at least one game element 120, the state of the game element 120 being the set of characteristics of the game element 120 (such as the vector velocity, the spatial coordinates of the game element 120 and so forth). The control module 160 may be configured to transmit the determined behavior parameters to the positioning module 140 in order to change the state of at least one game element 120, and transmit the determined behavior parameters to the visualization module 170.

In some exemplary aspects of the system, the control module 160 may include one or more input devices and sensor devices, including video cameras, motion sensors, range finders, thermal imagers, to track the behavior of the game elements 120, and also software to determine the parameters of that behavior.

In one exemplary aspect, the control module 160 may implement feedback from the game manipulator 130, which includes in a change in state of the game manipulator 130 on the basis of the behavior parameters of the game elements 120 to which the force action has been applied.

In one exemplary aspect, the control module 160 depending on the parameters determined for the game elements 120 can send the data to the positioning module 140 for the purpose of changing the physical properties of the game elements 120.

For example, during a game of snooker, after a colored billiard ball 120.2 drops into a pocket, the control module 160 determines the spatial coordinates of that billiard ball 120.2 and sends the data to the positioning module 140 in order to move that billiard ball 120.2 back onto the billiard table 120.1 in a predetermined position (according to the rules of snooker).

The visualization module 170 may be configured to generate a model of the behavior of the game elements 120 on the basis of the parameters of the game elements as determined by the positioning module 140 and the behavior parameters of the game elements as determined by the control module 160. In one exemplary aspect, the model of the behavior of the game elements 120 may include a set of virtual multidimensional models (such as 3D models) of the game elements 120, where each such model is matched up with unique temporal characteristics (such as the timestamp and the interval of time) during which said model is current. In other exemplary aspects, the module of the behavior of the game elements 120 may include a video stream recorded by the visualization module 170 of the generated playing field 120.

In one exemplary aspect, the visualization module 170 after generating the model of behavior of the game elements carries out a visualization (for example, a display on the computer monitor) of the game elements 120.

In one exemplary aspect, for the purpose of visualization of the generated behavior model of the game elements 120 there are used at least:
 virtual reality goggles or a virtual reality helmet worn by the user 100 (so the user can see the billiard table and the balls moving on top of it as if playing on a real billiard table);
 a monitor on whose screen the 3D model is displayed;
 game elements similar to those used in the system for simulating the behavior of the game elements during a remote game.

For example, as a result of the simulation of the behavior of the game elements 120 during a remote game, parameters have been obtained for the game elements 120 (such as the coordinates of the position of the game elements 120 on the playing field). On the playing field of the user 100, the positioning module 140 sets up the game elements 120 according to the parameters obtained.

In one exemplary aspect, the visualization of the behavior model of the game elements 120 generated by the visualization module 170 is done by module for repositioning a copy of the game elements 120 available to the user 100 at least
 manually, by the efforts of the user 100;
 automatically with the use of a module similar to the positioning module 140;
on the basis of the data provided by the visualization module 170 in the form of
 a set of data describing the positions (such as the three-dimensional coordinates) of the game elements 120;
 light markers of the position of the game elements 120 (for example, as generated by a system of lasers).

For example, if the user 100.1 is playing billiards at a billiard table, the visualization of the behavior model of the billiard balls 120.2 may include lighting up on said billiard table 120.1 the positions occupied by the billiard balls 120.2 after a shot is made by the user 100.2. Thus, the user 100.1, having placed the billiard balls 120.2 at the indicated positions, obtains a situation similar to the position on the remote billiard table 120.1.

After the user has performed the physical actions resulting in the application of a force action to the billiard balls on the remote billiard table, the billiard balls enter into movement and after a certain time come to a halt. After this, the control module 160 determines the positions of the billiard balls, and the data so obtained is sent to the visualization module 170. The visualization module 170 with the aid of a laser lights up the spots on the table where the billiard balls need to be placed in order for the arrangement of the balls to be identical to the arrangement of the balls on the remote billiard table.

Thus, with the use of the module for the system for modeling the behavior of game elements during a remote game, it becomes possible to organize a remote game of several users 100 with each other, while each of the users 100 taking part in the game can either possess the necessary equipment for the game (such as a billiard table) or not (only a virtual reality helmet).

Consider the working of the system for modeling the behavior of game elements during a remote game on the example of the organizing of a remote game of billiards between two users. Both users #1 100.1 and #2 100.2 are playing remotely, i.e., they are not standing next to the billiard table. User #1 100.1 is using, as game manipulator 130, a contact-type sensor game controller designed in the form of a cue stick, while user #2 100.2 is using a noncontact-type sensor game controller; thus, during the game, user #2 100.2 will take shots with his empty hand, and the game manipulator 130 will interpret these motions as shots with a cue stick. To visualize the results of the game, user #1 100.1 employs virtual reality goggles, while user #2 100.2 employs the screen of a projector onto which a video is translated from the chosen perspective.

Before the start of the game, the users select the type of game (such as snooker, Russian billiards, American pool, carom billiards, and so on) and send their choice to the control module 160. Depending on the chosen type of game and the specified game situation (for example, the position of the black ball when drawing for the right of the first shot), the control module 160 will send corresponding commands to the positioning module 140 to change the geometry of the billiard table 120 and place the balls 120 on the billiard table 120 in the order specified by the rules of the chosen game. A change in the modification of the billiard table 120 will be done by moving the tiles which form the sides and surface of the billiard table 120, and also by generating pockets of the required size. Likewise depending on the chosen type of billiards, balls of the necessary properties (size, color, etc.) will be chosen, and additional game elements (chips for carom billiards, etc.) will also be chosen.

Once the billiard table 120 and the game elements 120 are ready to play (the necessary dimensions, properties of the surface and sides have been established, the balls have been set up in the required order per the rules), the active phase of the game begins. User #1 100.1 takes a shot with the game manipulator "cue stick" 140, judging by the image produced on his virtual reality goggles 170. The sensors located in the cue stick determine the parameters of movement and the force with which that movement occurs. For example, these parameters may be the velocity and acceleration of movement of the cue stick, the direction of movement of the cue stick, the torsion of the cue stick, and so forth, and are transmitted to the module for applying force actions 150. The module for applying force actions 150 is a system of electromagnets situated beneath the billiard table 120. On the basis of the data obtained and according to the laws of electromagnetism, a calculation is done as to where on the table and in what configuration an electromagnetic pulse needs to be generated in order to produce a force action identical to that producing the hitting of the billiard ball by the cue stick. Since an electromagnetic system is used in the present example for controlling the movement of the billiard balls, special billiard balls are used which are identical in weight, surface parameters (force of friction etc.), balance, and so forth, to the billiard balls used when playing tabletop billiards, but containing materials having ferromagnetic properties and reacting to the electromagnetic pulses generated by the module for applying force actions 150.

After taking the shot, the control module 160 tracks the movement of the balls 120 over the billiard table 120, determines their spatial coordinates and transmits them to the visualization module 170 of the users 100. The visualization module 170 on the basis of the received data create a virtual model of the billiard table and the billiard balls on it. The control module 160 likewise tracks the course of the game, keeps score in the context of the established rules, and modifies the playing field 120 or the position of the balls 120 in the context of the established rules (for example, when playing snooker, after a successful shooting of a colored ball into a pocket that ball is taken out of the pocket by the positioning module 140 on command from the control module 160 and placed in the established position for that ball, while in the case of a miss or a miscue the previous position of the balls on the table is restored by the positioning module 140).

Figure 2:
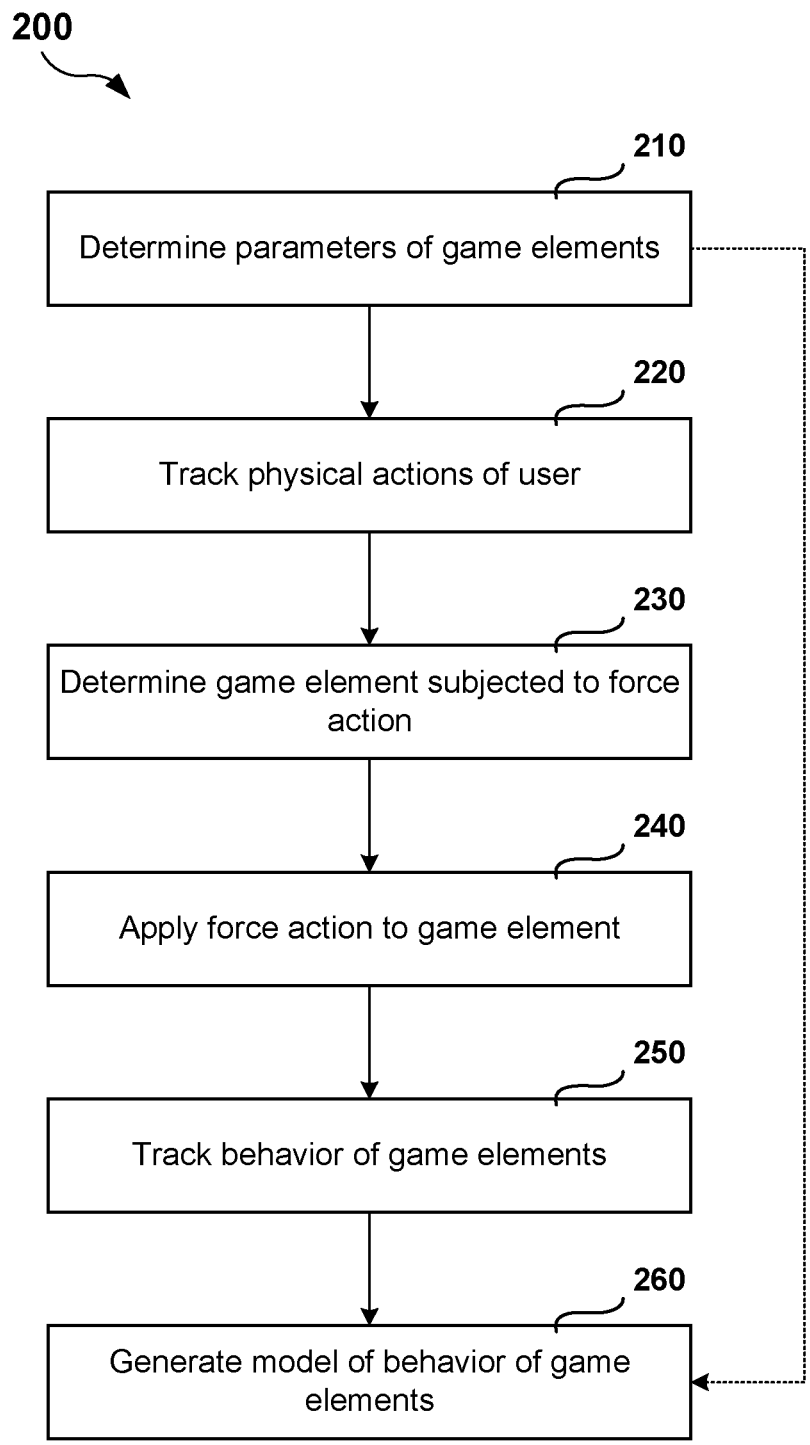
FIG. 2 illustrates a flowchart of a method for modeling the behavior of game elements during a remote game according to an exemplary aspect.

FIG. 2 illustrates a flowchart of a method 200 for modeling the behavior of game elements during a remote game according to an exemplary aspect.

The flowchart of the method 200 for modeling the behavior of game elements during a remote game contains the following steps: step 210, in which the parameters of the game elements 120 are determined, step 220, in which the physical actions of the user 100 are tracked, step 230, in which the game element 120 is determined for applying the force action, step 240, in which the force action is applied to the game element 120, step 250, in which the behavior of the game elements 120 is tracked, and step 260, in which the behavior model of the game elements 120 is generated.

In step 210 with the aid of the positioning module 140 the parameters of at least two game elements 120 are determined, these being material objects whose mutual arrangement and physical properties are determined by the parameters of the game elements, characterizing the states of those game elements.

In step 220 with the aid of the game manipulator 130 the physical action performed by the user 100 in order to apply a force action to at least one game element 120 is tracked, and upon detection of the physical action the physical parameters characterizing that physical action are calculated.

In step 230 with the aid of the module for applying force actions 150 and on the basis of the parameters determined in step 210 for at least one game element 120 and the physical parameters calculated in step 220, the game element 120 is determined which needs to be subjected to the force action, and the parameters of that force action on the determined game element 120 are calculated.

In step 240 with the aid of the module for applying force actions 150 the force action is applied to the game element 120 determined in step 230 in accordance with the parameters of the force action calculated in step 230.

In step 250 with the aid of the control module 160 the behavior of the game elements 120 is tracked and the parameters of the mentioned behavior are determined, the behavior parameters characterizing the change in state of the game elements 120.

In step 260 with the aid of the visualization module 170 a behavior model of the game elements 120 is generated on the basis of the parameters determined in step 210 for the game elements 120 and the behavior parameters determined in step 250 for the game elements 120.

Consider the working of the method 200 for modeling the behavior of game elements during a remote game on the example of organizing a remote game of tabletop soccer between two users. In order to visualize the game process, the user #1 100.1 uses a virtual reality helmet, and the user #2 100.2 uses a game table, equipped for playing tabletop soccer and equipped with a module for providing remote control. The action on the game elements 120 is applied by the user #1 100.1 via a game manipulator 130, and by user #2 100.2 via handles with which the game table is outfitted. Thus, user #1 100.1 will see the game as translated onto the display of the virtual reality helmet and control the game with the aid of the game manipulator 130, being a contact-type sensor game controller of "virtual reality gloves" kind, i.e., gloves equipped with sensors tracking the movement of the arms, hands, fingers, and so on.

At the start of the game, before the users 100 have begun to perform physical actions, the control module 160 resets the score to zero (0:0) and sends commands to the positioning module 140 to place the models of the soccer players in the starting positions, clear the playing field 120.1 of balls 120.2, if any are present on the playing field 120.1, and also set the ball 120.2 at the center of the field and prepare it for dropping.

After the game has begun, each user 100 tries to intercept the ball 120.2 with his players, moving about on the playing field 120.1, and drive it into the opposing goal posts. The models of the soccer players are rigidly attached to rods, and the rods themselves can perform translatory and rotational movements, which can be controlled by the users 100. For this purpose, the user #1 100.1 performs translatory movements with his arms and rotational movements with his hands, which are tracked by the sensors mounted on the "virtual reality gloves" worn by him. The movements are digitized, and the digitized data is used to determine the characteristics describing the actions of the user #1 100.1— the velocity and acceleration of the translatory movement of the arm (which will afterwards be interpreted as a translatory movement of the rod with the models of soccer players attached to it), the angular velocity and acceleration of the rotational movement of the hand (which will afterwards be interpreted as a rotational movement of the rod with the models of soccer players attached to it). With the use of precision sensors, it is possible to track not only changes in movement of the first and second order (velocity and acceleration), but also changes in movement of higher orders, making the simulation of the game process more accurate. After the characteristics are determined, they are sent to the module for applying force actions 150. The module for applying force actions 150 uses the received characteristics to determine the rod to which the force action should be applied. The obtained characteristics are converted into a signal going to electric motors executing the movement of the selected rod, both translatory and rotational. In this way, a striking of the ball by the model soccer players is performed. From the mentioned rod, the sensors of the module for applying force actions can determine the characteristics of vibration experienced by the rod, the velocity and acceleration of movement, and so forth, and send them to the game manipulator 130. Thus, the user #1 100.1 will not only control the soccer player models, but also feel the recoil reaction of the game manipulator 130 (for example, upon striking the ball there can occur a fixation of the ball between the soccer player model and the surface of the playing field 120, causing an abrupt stoppage of both translatory and rotational movement of the rod, which is noticeably felt by the arm when playing on a physical table). In this way, the user #1 100.1 can more accurately control his soccer player models.

As the game proceeds, the control module will carry out a constant (in real time) monitoring of the playing field: a video and audio recording will be produced, and the characteristics of the playing field 120.1 and the game elements 120.2 (the ball and the soccer player models attached to the rods) will be calculated. The video and audio data will be sent to the virtual reality helmet 170 of user #2 100.2. Thus, user #1 100.1 experiences the effect of being present, i.e., a state as if he were playing on a physical table directly in front of him. For a more accurate visualization, the position of the virtual reality helmet 170 can be tracked in order to make a video recording of the playing field 120.1 from such positions and from such a perspective as if the user #1 100.1 were located next to the playing field.

From the characteristics determined for the playing field 120.1 and the game elements 120.2 the control module 160 controls the course of the game: if the ball is driven home, the control module 160 changes the score and sends commands to the positioning module 140 to place the soccer player models in the starting positions, as well as set the ball 120.2 at the center of the field and prepare it for dropping.

FIG. 3 is a diagram illustrating a general-purpose computer system 20 on which aspects of systems and methods for scanning web pages may be implemented in accordance with an exemplary aspect. The computer system 20 may be configured as the control module 140 and other modules, described earlier.

As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 3, supra). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for modeling behavior of game elements during a remote game between at least two users, the method comprises:
   determining, by a hardware processor, parameters for at least two game elements representing physical objects, wherein mutual disposition and physical properties of the physical objects are determined by the parameters of the game elements, wherein the parameters for the game elements characterize the states of the game elements;
   responsive to detecting a physical action performed by a user in order to exert a force action on at least one game element, calculating, by a game manipulator, one or more physical parameters characterizing the physical action;
   determining, by a device, the game element to be subject to the detected physical action based on the determined parameters of at least one game element and the calculated physical parameters;
   calculating, by the device, the parameters of that force action on the determined game element;
   performing, by the device, a force action on the determined game element in accordance with the calculated parameters of the force action;
   determining, by the hardware processor, one or more behavior parameters for the game elements, wherein the behavior parameters characterize a change in state of the game elements; and
   generating, by the hardware processor, a behavior model of the game elements based on the determined parameters of the game elements and the determined behavior parameters of the game elements.

2. The method of claim 1, wherein spatial coordinates and physical properties of the physical objects corresponding to the game elements are determined by the physical parameters of the game elements.

3. The method of claim 1, wherein at least one of the game elements represents a playing field comprising a physical object on which other game elements are situated.

4. The method of claim 1, wherein the game elements are remote from the user so that the user in performing the physical action is not able to directly apply a force action to the game elements.

5. The method of claim 1, wherein the physical parameters of the physical action include at least one of a vector and magnitude of a velocity of application of the physical action, a vector and magnitude of a momentum of application of the physical action, a vector and magnitude of an angular momentum of application of the physical action, and energy transmitted as a result of the application of the physical action.

6. The method of claim 1, wherein the force action on the game element is applied by at least one of: mechanically by striking the game element and by transfer of an electromagnetic pulse to the game element.

7. The method of claim 1, wherein the parameters of the force action include at least one of a time of the force action; a position of the force action on the game element; a force exerted on the game element in the determined position and at the determined time.

8. The method of claim 1, wherein the force exerted on the game element is characterized by at least one of a physical force acting on the game element; a momentum transmitted to the game element; and energy transmitted to the game element.

9. The method of claim 1, wherein the behavior model of the game elements includes at least one of: a set of virtual three-dimensional (3D) models of the game elements, where each said 3D model is coordinated with a time during which said 3D model was the current one; and a video stream recorded of a game element comprising a playing field.

10. The method of claim 1, further comprising:
    generating a visualization of the game elements based on the generated behavior model of the game elements.

11. A system for modeling behavior of game elements during a remote game between at least two users, wherein the system comprises:
    a hardware processor configured to determine parameters for at least two game elements representing physical objects, wherein mutual disposition and physical properties of the physical objects are determined by the parameters of the game elements, wherein the parameters for the game elements characterize the states of the game elements;
    one or more game manipulators configured to detect a physical action performed by a user in order to exert a force action on at least one game element and calculate one or more physical parameters characterizing the physical action; and
    a device for performing force actions configured to:

determine the game element to be subject to the detected physical action based on the determined parameters of at least one game element and the calculated physical parameters, calculate the parameters of that force action on the determined game element, perform a force action on the determined game element in accordance with the calculated parameters of the force action;

wherein the hardware processor is further configured to:

determine one or more behavior parameters for the game elements, wherein the behavior parameters characterize a change in state of the game elements; and generate a behavior model of the game elements based on the determined parameters of the game elements and the determined behavior parameters of the game elements.

12. The system of claim 11, wherein the at least two users each employ one of the game manipulators to perform the force action on at least one game element.

13. The system of claim 11, wherein the behavior parameters of the game elements characterize the change in state of the game manipulator.

14. The system of claim 11, wherein the system further comprises at least one of a video camera, a motion sensor, a range finder, and a thermal imager for tracking the behavior of the game elements.

15. The system of claim 11, wherein the hardware processor is further configured to implement a feedback from the game manipulator, having in a change in state of the game manipulator based on the behavior parameters of the game elements to which the force action has been applied.

16. The system of claim 11, wherein the force action on the game element is applied by at least one of: mechanically by striking the game element and by transfer of an electromagnetic pulse to the game element.

17. The system of claim 11, wherein the force exerted on the game element is characterized by at least one of a physical force acting on the game element; a momentum transmitted to the game element; and energy transmitted to the game element.

18. The system of claim 11, wherein the behavior model of the game elements includes at least one of: a set of virtual three-dimensional (3D) models of the game elements, where each said 3D model is coordinated with a time during which said 3D model was the current one; and a video stream recorded of a game element comprising a playing field.

19. The system of claim 11, wherein the hardware processor is further configured to:

generate a visualization of the game elements based on the generated behavior model of the game elements.

20. A non-transitory computer readable medium comprising computer executable instructions for modeling behavior of game elements during a remote game between at least two users, including instructions for:

determining, by a hardware processor, parameters for at least two game elements representing physical objects, wherein mutual disposition and physical properties of the physical objects are determined by the parameters of the game elements, wherein the parameters for the game elements characterize the states of the game elements;

responsive to detecting a physical action performed by a user in order to exert a force action on at least one game element, calculating, by a game manipulator, one or more physical parameters characterizing the physical action;

determining, by a device, the game element to be subject to the detected physical action based on the determined parameters of at least one game element and the calculated physical parameters;

calculating, by the device, the parameters of that force action on the determined game element;

performing, by the device, a force action on the determined game element in accordance with the calculated parameters of the force action;

determining, by the hardware processor, one or more behavior parameters for the game elements, wherein the behavior parameters characterize a change in state of the game elements; and generating, by the hardware processor, a behavior model of the game elements based on the determined parameters of the game elements and the determined behavior parameters of the game elements.

* * * * *